July 10, 1951         H. W. HART         2,560,105
HYDRAULIC BRAKE SYSTEM
Filed Feb. 21, 1950
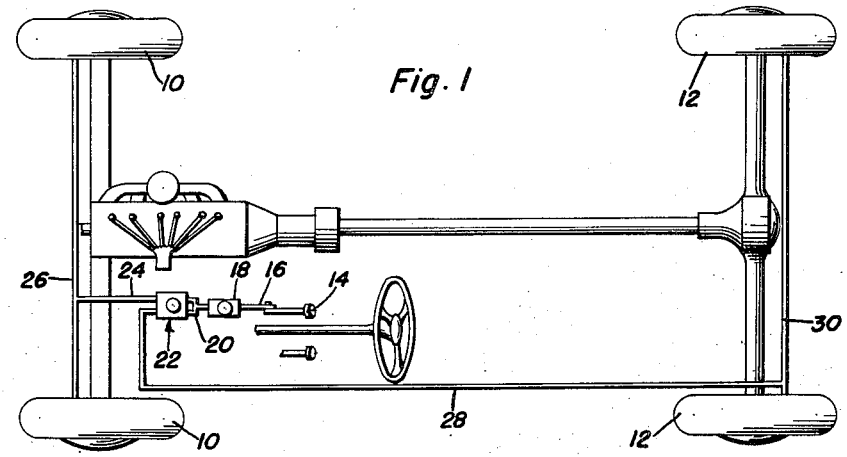
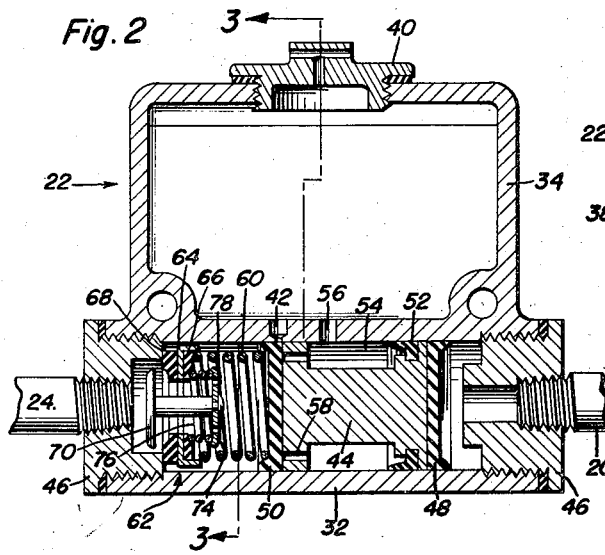
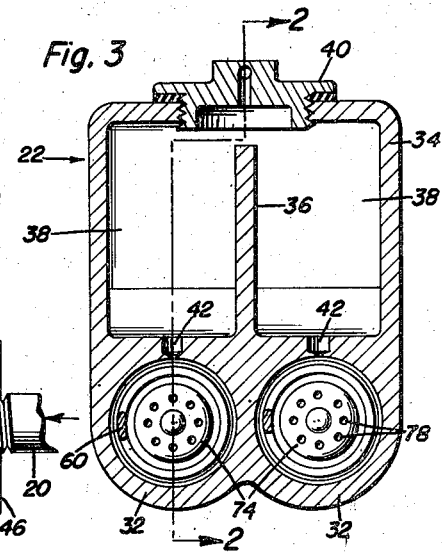
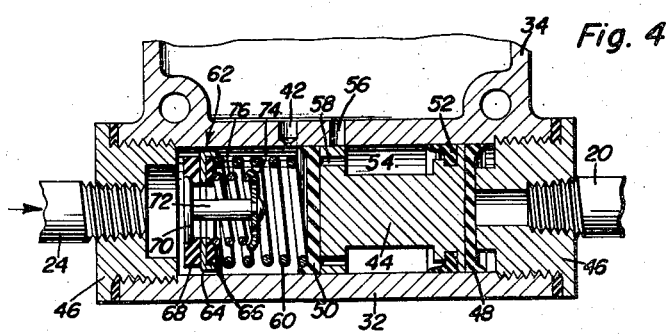
Henry W. Hart
INVENTOR.
BY *Clarence A. O'Brien*
*and Harvey B. Jacobson*
Attorneys Patented July 10, 1951

2,560,105

UNITED STATES PATENT OFFICE 2,560,105

HYDRAULIC BRAKE SYSTEM

Henry W. Hart, Idabel, Okla.

Application February 21, 1950, Serial No. 145,557

1 Claim. (Cl. 60—54.5)

This invention relates generally to automotive vehicles and more particularly to a hydraulic brake system in which a single master cylinder is connected to branch cylinders which are in turn connected to the front wheels and the rear wheels of the vehicle, respectively.

The primary object of this invention is to provide a hydraulic brake system in which leaks can be located by an inspection of the branch cylinders, that wheel or wheels which are connected to a particular branch cylinder having the leaking tube connected thereto being indicated by a low level of the hydraulic fluid in the branch cylinder concerned, or it may be that this particular branch cylinder will be empty at the time of inspection, while the other branch cylinder or cylinders will indicate a higher level of brake fluid.

An equally important object is to provide a hydraulic brake system which makes an automotive vehicle whereon it is installed more safe to operate, since each pair of wheels, that is the front wheels, rear wheels or the other like pair of wheels, in vehicles having more than four ground-contacting wheels, will be braked independently of the other pairs, thus aiding in preventing swerving of the motor vehicle upon the application of brakes when any particular line leading from the usual single master cylinder becomes ruptured. It should also be noted that an allied object is the provision of a hydraulic brake system in which the likelihood of all the hydraulic brakes on an automotive vehicle becoming disabled at the same time is decreased. Finally, in this regard, the simple fact that detection of the leak is facilitated by this system, encourages prompt repair and thus further decreases likelihood of accidents.

Specific objects of this invention include the provision of means for lubricating and sealing a floating piston in each of the branch cylinders, and the provision of means for allowing substantially unrestricted flow of brake fluid in the direction away from the master cylinder, while restricting the return flow of the brake fluid.

And a last object to be specifically mentioned is to provide a device of this character which is relatively inexpensive and practicable to manufacture, which is easy to install, economical and simple in operation as well as safe, and which will give generally efficient and durable service.

With these objects definitely in view, this invention resides in certain novel features of construction, combination and arrangement of elements and portions as will be hereinafter described in detail in the specification, and particularly pointed out in the appended claim, and illustrated in the accompanying drawing which forms a material part of this application, and in which:

Figure 1 is a diagrammatic view of portions of an automotive vehicle with this invention operatively applied thereon;

Figure 2 is a vertical sectional view taken substantially on the line 2—2 in Figure 3;

Fig. 3 is a longitudinal vertical sectional view taken substantially on the line 3—3 in Figure 2; and Figure 4 is a view of one of the branch cylinders and contiguous elements, showing the same branch cylinder as represented in Figure 2 and with the floating piston, spring and valve in position into which fluid is being returned from the wheel cylinders, it being noted that in Figure 2 the fluid is being forced out of the branch cylinder toward a wheel cylinder, which wheel cylinder is thought to be unnecessary to illustrate in the present disclosure as conventional wheel cylinders can be used with this invention.

Similar characters of reference designate similar or identical elements and portions throughout the specification and throughout the different views of the drawing.

Referring now to the drawing in detail this invention is adapted to be used with an environment including an automotive vehicle having front wheels 10 and rear wheels 12, together with other pairs of ground-contacting wheels in certain instances not described or illustrated, and a brake pedal 14.

Brake pedal 14 is connected by means of a link 16 with a single master cylinder 18 which may be of conventional character. A branch pipe 20 connects the master cylinder 18 with a dual branch cylinder unit 22 which will be described hereinafter in detail. Pipes 24 and 26 connect one branch cylinder to the front wheels 10 while pipes 28 and 30 connect another branch cylinder, also to be described hereinafter, with the rear wheels 12.

A single casing 32 houses the above referred to unit 22 which includes a pair of parallel branch cylinders 32, and the upper part of the casing 34 is divided by a partition 36 to define a pair of reservoirs 38, having a common filler opening and screw cap 40. The reservoirs 38 are individually connected to the corresponding cylinder 32 by ports 42. Within each cylinder 32 there is slidably mounted a floating piston 44, this piston being inserted, along with certain other parts hereinafter mentioned, into the cylinder from either end thereof by removal of the corresponding nipple 46, one of which is provided at each end of each cylinder 32. A cup packing, represented as being constructed of rubber, is provided at each end of the floating piston 44, as indicated at 48 and 50. Another annular packing 52 is mounted in a circumferential groove provided in an intermediate portion of the floating system 44, and a comparatively wide circumferential channel 54 is formed on the floating piston and positioned to communicate with a second port 56 in each cylinder 32, when the floating piston is moved into the position indicated in Figure 2. The channel 54 is in direct communication with the annular packing 52 and a plurality of longitudinally disposed bores 58 lead from the channel 54 to the end of the floating piston abutting the cup packing 50. It will be understood that this construction allows lubrication and sealing of the annular packing 52 and the cup packing 50, the similar lubrication and sealing of the cup packing 48 requiring no special provisions inasmuch as the hydraulic fluid from the branch pipe 20 is in direct communication with this cup packing 48.

A coiled spring 60 is compressed between the cup packing 50 and the valve generally indicated at 62. This valve includes a cupped metal annulus 64 and a pair of deformable washers 66 and 68 on either side of the element 64. The coiled spring 60 will preferably fit within the branch of the annulus 64 and will seat upon the washers 66, pressing the valve 62 as a unit away from the floating piston 44 and into engagement with the adjacent nipple 46.

The valve 62 also includes a plunger 70 having a shank 72 extending through the central apertures of the washers 66 and 68 and central apertures of the annulus 64. The end of the shank 72 carries a disc 74, and a coiled spring 76 is compressed between the washer 66 and this disc 74 to bias the plunger 70 into valve closing position. This action should not be confused with the action of the valve 62 moving as a unit against the action of the spring 60. The disc 74 may be apertured as indicated at 78 to further lighten the construction of the element and to further the free flow of fluid in the direction indicated by the arrow in Figure 2.

The operation of this invention will be clearly understood from a consideration of the foregoing description of the mechanical details thereof, taken in connection with the above defined objects and the drawings. In recapitulation, upon application of pressure on the brake pedal 14, this pressure is transmitted through the single master cylinder 18 to fluid flowing in the direction of the arrow in Figure 2 against the floating piston 44. The fluid in the other end of this same cylinder, it being understood that both cylinders are equally and simultaneously operated in the normal use of the device, transmits pressure to fluid flowing into the pipes leading to the wheel cylinder, not illustrated, causing application of the brake on these wheels. In the event of a leak occurring, say in the tube 24, the fluid in the corresponding reservoir 38 will tend to become quickly exhausted, especially when the brake pedal 14 is rapidly shifted by the operator in an attempt to acquire normal braking action. In the meantime, a certain amount of protection is given against sudden loss of fluid, since in the instant invention there are three reservoirs rather than a single reservoir as provided in the conventional master cylinder. Furthermore, the braking action will be entirely upon one pair of wheels, such as the front wheels 10 or the rear wheels 12 so that swerving of the vehicle will ordinarily be prevented. Detection of the fault in the system is facilitated, since the repairman can locate the leak as being in the tube connected to the front wheels 10 or to the rear wheels 12, simply by inspection of the reservoirs 38, all hereinbefore mentioned in the objects of this invention. It will also be clear that the other possibly equally important objects of this invention are amply achieved by this invention. Further description would appear unnecessary.

Having described the invention, what is claimed as new is:

In a hydraulic brake system for automotive vehicles, a master cylinder with a pedal operated piston and a single fluid conducting conduit at one end thereof, a pair of branch cylinders spaced from said master cylinder, each of said branch cylinders having a branch pipe operatively connected with said master cylinder conduit, a first branch pipe connected to one branch cylinder and a second branch pipe connected to the other branch cylinder, said first and second pipes being separate and independent of each other and adapted to conduct fluid to and from wheel cylinders, said branch cylinders having individual hydraulic fluid reservoirs, said cylinders having ports communicating with said reservoirs, and a floating piston in each cylinder, whereby pressure is transmitted through said branch cylinders and fluid from the reservoirs is fed into the branch cylinders to replace fluid leaking from the system, said reservoirs thus functioning as indicators of which branch of the system is leaking since the level of the fluid in the corresponding reservoir falls, said floating piston having a spring biasing the same toward the end of the branch cylinder adjacent the master cylinder, and a valve in the opposite end of the branch cylinder allowing substantially unrestricted outflow and restricted inflow, said valve being mounted between said opposite end and said spring, and said restricted flow being accomplished by shifting the valve longitudinally of the branch cylinder against the action of said spring, said valve having a plunger, a weak spring biasing said valve into closing position, said substantially unrestricted flow being accomplished by shifting of said plunger against the action of said weak spring.

HENRY W. HART.

REFERENCES CITED

The following references are of record in the file of this patent:

UNITED STATES PATENTS

| Number | Name | Date |
| --- | --- | --- |
| Re. 19,432 | Carroll | Jan. 22, 1935 |
| 1,952,557 | Masteller | Mar. 27, 1934 |
| 2,024,042 | Jance | Dec. 10, 1935 |
| 2,058,595 | Klein | Oct. 27, 1936 |
| 2,074,416 | Oliver | Mar. 23, 1937 |
| 2,157,733 | Sessions | May 9, 1939 |
| 2,162,114 | Oliver | June 13, 1939 |
| 2,249,227 | Press | July 15, 1941 |